US005235813A

United States Patent [19]

McVey et al.

[11] Patent Number: 5,235,813

[45] Date of Patent: Aug. 17, 1993

[54] MECHANISM FOR CONTROLLING THE RATE OF MIXING IN COMBUSTING FLOWS

[75] Inventors: John B. McVey, Glastonbury; Jan B. Kennedy, South Windsor, both of Conn.

[73] Assignee: United Technologies Corporation, Hartford, Conn.

[21] Appl. No.: 632,861

[22] Filed: Dec. 24, 1990

[51] Int. Cl.[5] .......... F23R 3/22; F02C 7/042

[52] U.S. Cl. .......... 60/737; 60/740; 431/181; 431/189

[58] Field of Search .......... 60/737, 39.03, 262, 60/740, 264; 431/181, 188, 189; 239/420, 424, 402.5, 403, 404; 261/78.2, 128, 76; 244/199

[56] References Cited

U.S. PATENT DOCUMENTS

| | | | |
|---|---|---|---|
| 1,998,235 | 4/1935 | Haynes | 239/402.5 |
| 2,898,874 | 8/1959 | Crewdson, Jr. | 239/402.5 |
| 3,514,955 | 6/1970 | Paulson et al. | 60/262 |
| 3,696,617 | 10/1972 | Ellis | 60/264 |
| 3,937,008 | 2/1976 | Markowski et al. | 60/39.06 |
| 3,974,646 | 8/1976 | Markowski et al. | 60/737 |
| 4,199,934 | 4/1980 | Meyer | 60/749 |
| 4,348,170 | 9/1982 | Vatsky et al. | 431/188 |
| 4,815,531 | 3/1989 | Presz, Jr. et al. | 165/151 |
| 4,835,961 | 6/1989 | Presz, Jr. et al. | 60/264 |

*Primary Examiner*—Richard A. Bertsch
*Assistant Examiner*—Timothy S. Thorpe

[57] ABSTRACT

A mixing device is comprised of a pair of nested flow separator conduits (202, 204) with convolutions (201, 206) on the outlet ends (203, 205) and means of adjusting the relative position of the convolutions on one of the outlet ends relative to the convolutions on the other outlet end. The relative movement of the convolutions (201, 206) provides a method to modulate the rate of mixing between flows passing through the flow separator conduits (202, 204). Exemplary embodiments of the invention include application of the mixing device as a furnace (20) and as a gas turbine combustor (150).

17 Claims, 6 Drawing Sheets

MECHANISM FOR CONTROLLING THE RATE OF MIXING IN COMBUSTING FLOWS

TECHNICAL FIELD

This invention relates to a mechanism for controlling the rate of heat release in combusting flows, and more particularly to a mechanism for controlling the rate of mixing in combusting flows.

BACKGROUND ART

Burners utilize combustion processes which involve the mixing of fuel and air and generating energy, typically in the form of heat, from the combustion of this mixture. The current method of increasing the volumetric heat release of the combustion is to increase the gross fuel input. This technique extends the flame length which is a drawback for burners with fixed length enclosures, such as radiant tube burners or gas turbine combustors.

Another method to increase the volumetric heat release is to increase the rate of mixing between the fuel flow and the oxidant flow. Typical devices which increase the rate of mixing include baffles, which are a series of perforated plates placed in the flow paths to introduce turbulence, and swirlers, which produce a spiralling motion in the body of the combined flow. Both of these devices are effective but produce significant momentum losses in the flow which reduce efficiency. Additionally, neither method is amenable to manipulation for the purpose of modulating the rate of mixing in order to control the heat release from the combustion.

A device that has been found to increase mixing without the accompanying momentum loss is a convoluted trailing edge placed between the flows to be mixed. The convoluted edge produces a series of large scale streamwise vortices of alternating rotation, generating an exchange of fluid between the flows, which rapidly break down into random turbulence. The alternating rotation of the vortices imparts no net angular momentum to the flow and tests have shown that the mixing is accomplished without significant momentum losses. This technique is described more fully in AIAA Paper No. 89-0619 *Flame Propagation Enhancement Through Streamwise Vorticity Stirring,* AIAA 27th Aerospace Sciences Meeting (Jan. 9–12, 1989).

Convoluted trailing edges have found many applications in areas where increasing the rate of mixing between flows is beneficial. In U.S. Pat. No. 4,835,961 fixed convoluted trailing edges were placed between a primary high energy flow and a low energy secondary flow in order to improve the pumping efficiency and thrust of an ejector pump. In U.S. Pat. No. 4,815,531 fixed convoluted trailing edges are used to improve the heat transfer in a flow over a heat source by increasing the rate of mixing within the flow and by minimizing the build-up of a thermal boundary layer. In U.S. Pat. No. 3,937,008 a fixed, convoluted, and canted trigger mechanism was suggested to promote rapid mixing and combustion. The convolutions were canted relative to the direction of flow in order to produce a swirl. The cited result is a low $NO_x$ emission combustion and an axially shorter combustion chamber.

Although the many advantages of using convoluted trailing edge devices to increase mixing are well documented, there is no prior art describing the use of such a device to modulate the rate of mixing.

DISCLOSURE OF INVENTION

An object of the invention includes an improved method and device to modulate the rate of mixing of multiple flows with minimal momentum loss in the flows.

Another object of the present invention is a furnace which provides improved control of the volumetric heat release rate of the combusting flow.

Still another object is a gas turbine which provides improved control of the combustion rate.

According to the present invention, a conduit means comprised of a plurality of nested flow conduits with convolution means on the outlet ends and means for adjusting the relative position of the convolution means provides a method and device to modulate the rate of mixing of the flows. The use of convolution means on the outlet ends, and which are adapted to generate adjacent pairs of counter-rotating, large scale vortices, provides improved flow mixing with minimal momentum losses in the flows.

"Nested" conduits as used herein means a plurality of conduits of graduated radial dimension each positioned within the immediately larger one.

"Large scale" vortices as used herein means vortices which have dimensions of the same order of magnitude as the maximum height of the convolutions which generate the vortices.

In an exemplary embodiment, a furnace is comprised of a heating chamber, a primary conduit which passes through the heating chamber and has a combustion region enclosed within the heating chamber, a secondary conduit which is partially nested within the primary conduit and has convolutions on the outlet end, a fuel conduit which is partially nested within the secondary conduit and has convolutions on the outlet end, and means for adjusting the position, relative to each other, of the convolutions on the fuel conduit and the convolutions on the secondary conduit. The radial separation between the primary conduit and the secondary conduit defines an annular passage for a primary flow of oxidant; the radial separation between the secondary conduit and the fuel conduit defines an annular passage for a secondary flow of oxidant; and the fuel conduit is adapted to carry a flow of fuel.

The primary, secondary, and fuel flows mix immediately downstream of the outlet ends. If the convolutions on the two outlet ends are in-phase, the flow patterns generated by the convolutions are mutually reinforcing and a series of large scale vortices are created. The vortices increase the rate of mixing between the flows. If the convolutions are out-of-phase, the flow patterns are mutually destructive and the large scale vortices are not created. The rate of mixing for the out-of-phase position is significantly lower than for the in-phase position. As the alignment of the convolutions is varied between the out-of-phase position and the in-phase position the rate of mixing varies correspondingly. The relative axial position of the convolutions may also be altered in order to vary the interaction between the flow patterns generated (either to mutually reinforce or destroy) and thereby provides an additional means to modulate the rate of mixing.

By rotating the outlet ends or moving the outlet ends axially relative to each other, the rate of mixing is caused to vary, and may be controlled. Modulation of the mixing rate permits the volumetric heat release to be increased or decreased with considerably less variation in the flame length as would occur if the gross fuel input were modulated. Additionally, the better mixing results in a more uniform temperature profile within the combustion chamber and downstream of the combustion chamber, lower $NO_x$ emissions, and improved combustion stability.

In another exemplary embodiment, a gas turbine is comprised of a diffuser, a combustor shroud, a combustor case defining a combustion region, a pair of fuel injectors, a primary flow splitter with convolutions on the outlet end, a secondary flow splitter partially nested within the primary flow splitter and with convolutions on the outlet end, and a means for adjusting the position, relative to each other, of the convolutions on the primary flow splitter and the convolutions on the secondary flow splitter. The flow splitters are located downstream of the diffuser, upstream of the combustion region, and between the pair of fuel injectors.

A flow of oxidant passes through the diffuser and into the combustor shroud. A portion of the oxidant flow then passes through a passage defined by the secondary flow splitter, a portion passes through an annular passage defined by the separation between the primary flow splitter and the secondary flow splitter, and the remainder passes through an annular passage defined by the separation defined by the separation between the primary flow splitter and the combustor case wall. The oxidant mixes with the fuel exiting the fuel injectors downstream of the outlet ends of the flow splitters.

If the convolutions on the flow splitters are in-phase, a series of large scale vortices are created in the oxidant flow. The large scale vortices increase the mixing rate between the airflow and the fuel exiting the fuel injectors. If the convolutions are out-of-phase, the large scale vortices are not created, and the mixing rate is decreased. The alignment of the convolutions, and thereby the rate of mixing, can be varied between the out-of-phase position and the in-phase position. In addition, the relative axial position may also be altered in order to vary the rate of mixing in the combustion region.

Modulation of the rate of mixing of the fuel and oxidant permits the combustion rate within the gas turbine to be controlled without altering the amount of fuel flow. This permits the combustion rate to be varied with considerably less variation in the flame length and flame attachment point within the gas turbine. Additionally, the better mixing results in a more uniform temperature profile within the combustion region and in lower nitrous oxide emissions.

Although the invention as described is particularly useful for modulating the volumetric heat release of a combusting flow for a furnace and a gas turbine, it should be understood that the invention is equally applicable to any process which benefits from the control of the rate of mixing of two or more fluid flows.

The foregoing and other objects, features and advantages of the present invention will become more apparent in light of the following detailed description of the exemplary embodiments thereof, as illustrated in the accompanying drawings.

BEST MODE FOR CARRYING OUT THE INVENTION

Figure 1:
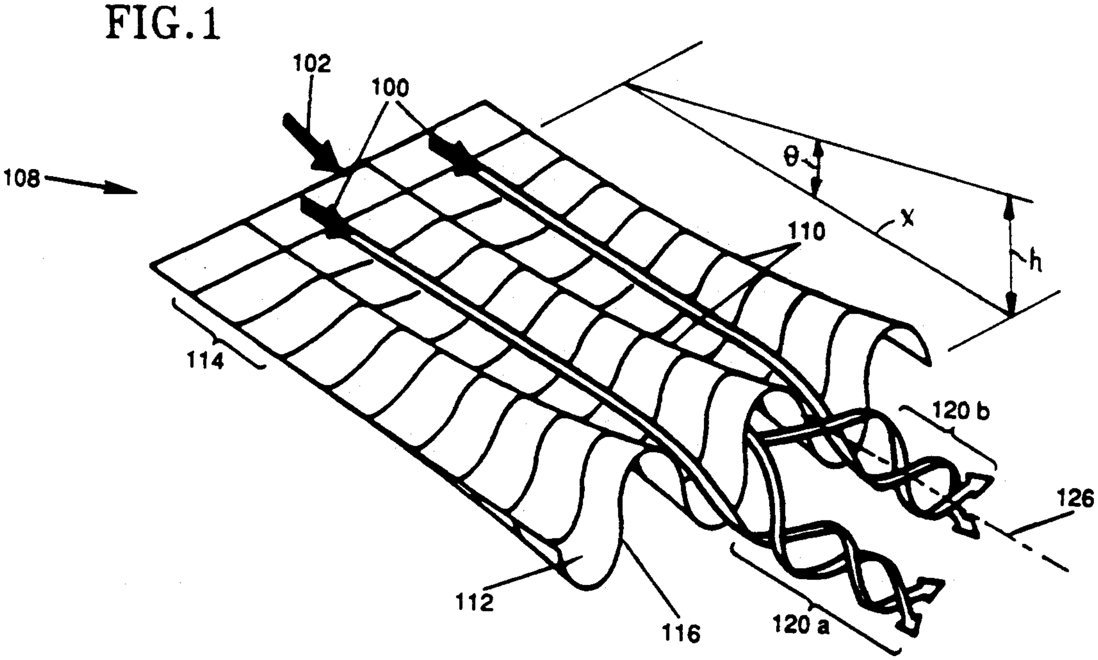
FIG. 1 is an illustration of streamwise vortices generated by convolutions on a trailing edge of a flow separator plate.

To help understand the present invention consider, first, the illustrative views of FIGS. 1 through 5. FIG. 1 is an illustration of the mixing between an upper flow 100 and a lower flow 102 due to the presence of convolutions on the downstream end of a flow separator plate 108. The convolutions consist of a plurality of adjacent, downstream extending lobes 110 and troughs 112 which blend smoothly with the separator plate 108 at their upstream ends 114 and have a maximum height h at the trailing edge 116 of the separator plate 108. A lobe 110 which penetrates into the upper flow 100 creates a corresponding trough 112 in the lower flow 102, and the converse is also true.

Figure 2:
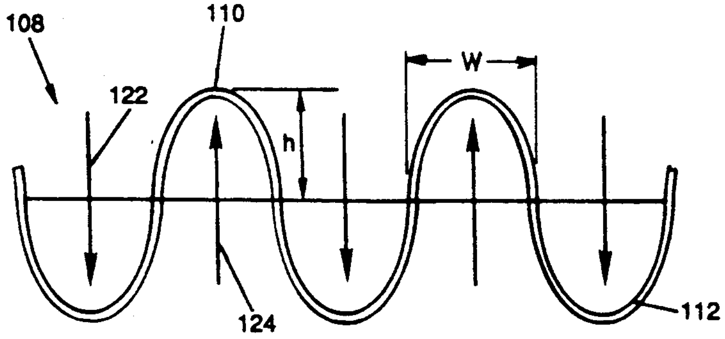
FIG. 2 is an end view of the flow separator plate of FIG. 1.

The convolutions on the separator plate 108 generate a series of large-scale counter-rotating vortices 120*a*,120*b* which break down into small scale turbulence further downstream of the separator plate 108 and enhance mixing. As shown in FIG. 2, as the upper flow 100 travels down the separator plate 108 the troughs 112 introduce a downward component 122 into the upper flow 100. On the opposite side of the separator plate 108, the lobes 110 introduce an upward component 124 into the lower flow 102. Immediately downstream of the separator plate 108 the interaction of the downward component 122 of the upper flow 100 and the upward component 124 of the lower flow 102 generates a vortex 120 centered at the mid-span of the adjacent troughs which travels downstream in a spiralling motion about an axis 126 in the streamwise direction.

Figure 3:
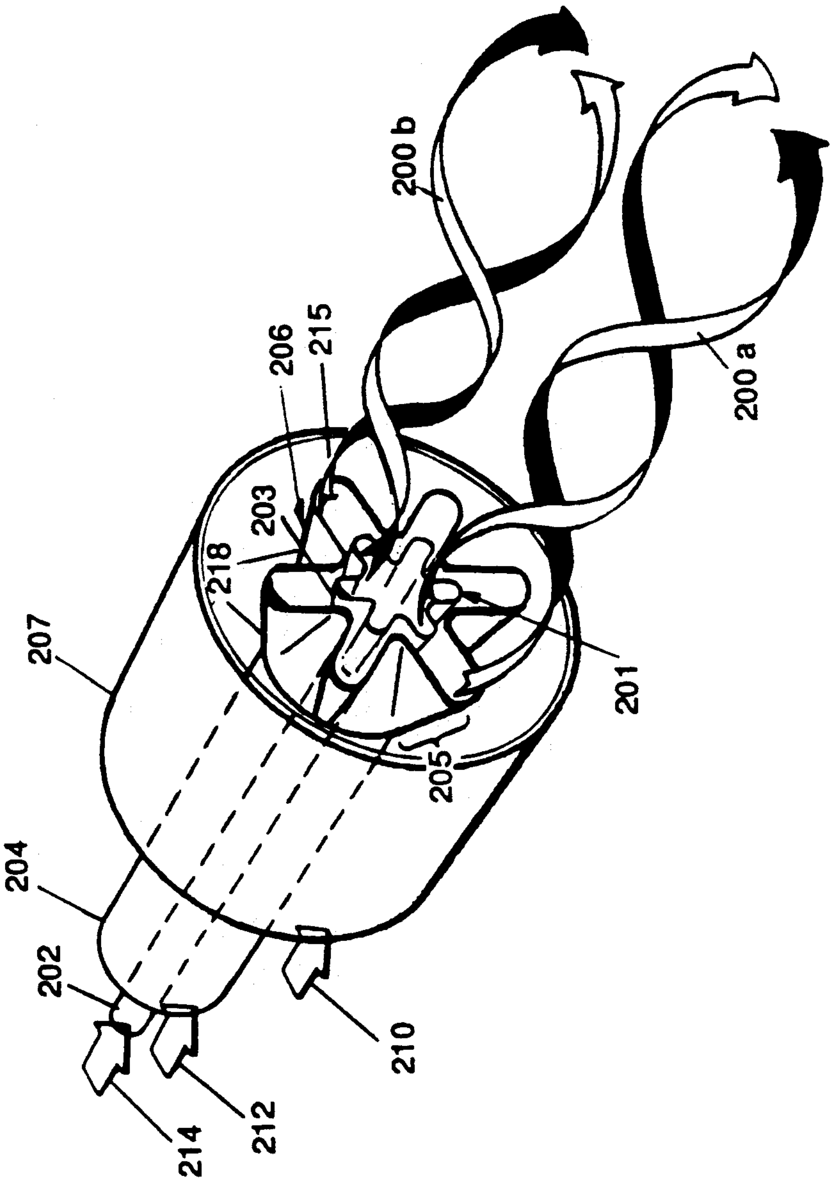
FIG. 3 is an illustration of streamwise vortices generated by nested flow separator conduits with convolutions on the outlet ends which are in-phase.
Figure 4:
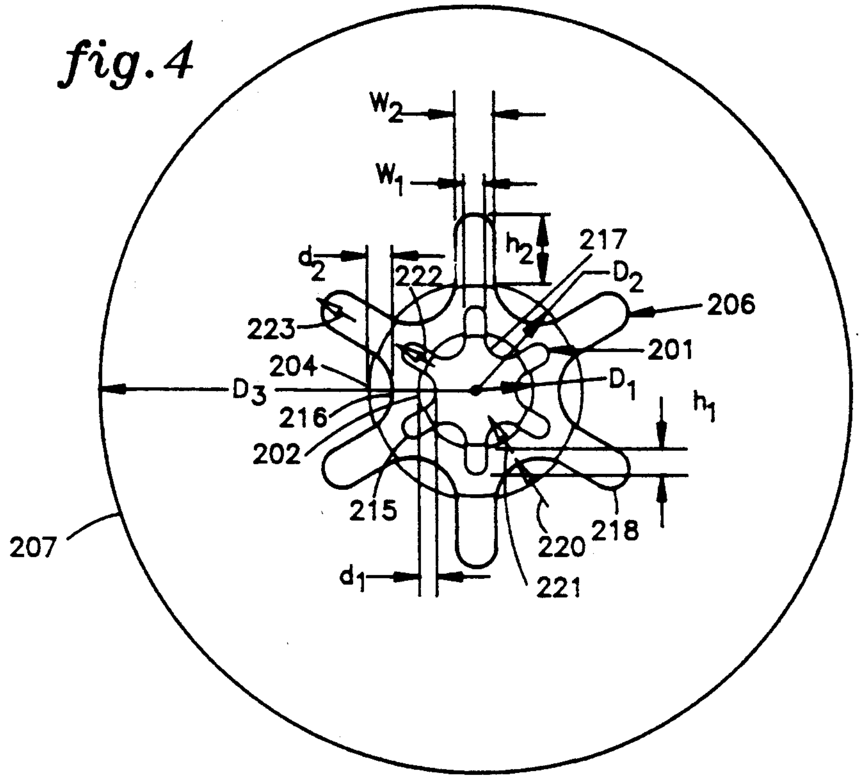
FIG. 4 is an end view of the nested flow separator conduits of FIG. 3.

FIG. 3 and its corresponding end view FIG. 4 show a pair of nested flow separator conduits 202,204 with convolutions 201,206, respectively, on the outlet ends 203,205. Each conduit 202,204 has six axisymmetrically disposed convolutions. The two conduits 202,204 are surrounded by a third conduit 207; and the radial separation between the conduits define flow passages for an outer flow 210, a middle flow 212, and a inner flow 214. In FIG. 3 the convolutions 201,206 are in-phase, which occurs when the lobes 218 on the conduit 204 are radially aligned with the lobes 215 on the conduit 202. As shown in FIG. 4, when the convolutions 201,206 are in-phase a radially inward component 220 of the outer flow 210 aligns with a radially inward component 221 of the middle flow 212 and they reinforce each other. Correspondingly, a radially outward component 222 of the inner flow 214 and a radially outward component 223 of the middle flow 212 also reinforce each other. The result is a series of vortices 200*a*,200*b* larger and stronger than those generated by a single convoluted plate or conduit. As previously mentioned, the vortices 200*a*,200*b* break down into small scale turbulence further downstream of the outlet ends 203,205 and enhance mixing.

Figure 5:
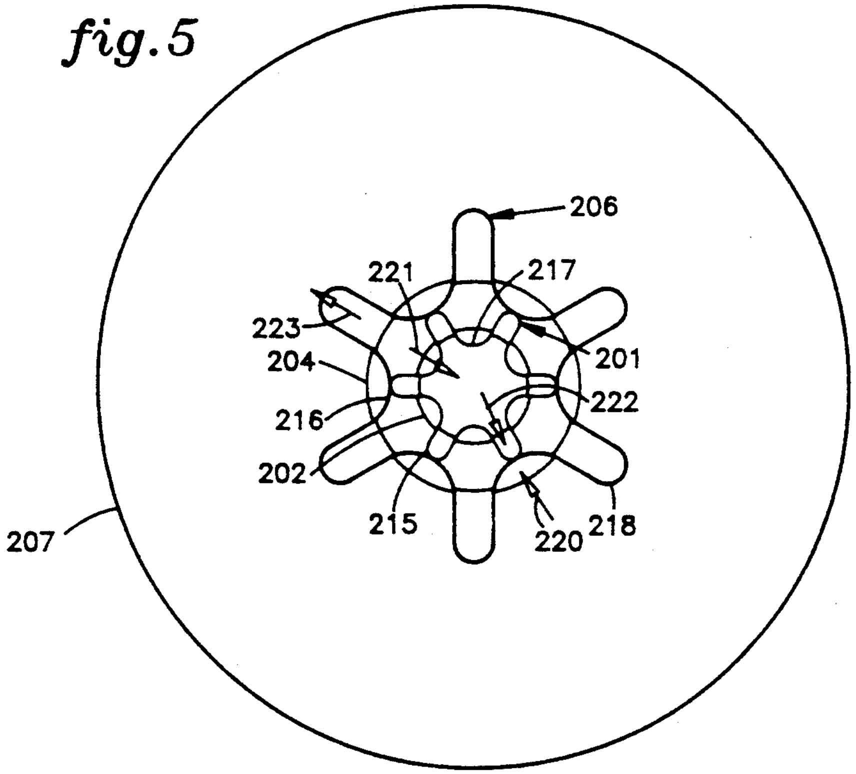
FIG. 5 is an end view of the nested flow separator conduits of FIG. 3, but with the innermost flow conduit rotated such that the convolutions on the outlet ends of the two inner conduits are out-of-phase.

FIG. 5 is an illustration of the conduits 202,204 with the convolutions 201,206 out-of-phase, which occurs when the troughs 216 on the conduit 204 are aligned with the lobes 215 on the conduit 202. For out-of-phase convolutions, the radially outward flow components 222,223 and radially inward flow components 220,221 are mutually destructive. The large scale vortices 200*a*,200*b* (see FIG. 3) are not generated and, therefore, a lower rate of mixing occurs than with in-phase convolutions.

As the alignment of the convolutions 206 is varied between the out-of-phase position (FIG. 5) and the in-phase position (FIG. 4), the rate of mixing varies correspondingly. In this way the rate of mixing can be continuously varied from a minimum (out-of-phase) to a maximum (in-phase) by rotation of one of the convoluted outlet ends 203,205.

It is believed that best mixing may be obtained if certain parametric relationships are met regarding the geometric shape of the convolutions. These parametric relationships are based on empirical data, known flow theory, and hypothesis concerning the phenomenon involved. First, the number of convolutions on each flow separator are preferably by the same, in order to be able to create an in-phase and out-of-phase condition. Additionally the number of convolutions can also effect the strength of the vortices generated. If the number of convolutions is too small, the effectiveness decreases due to a lack of interaction between the flow exiting the convolutions. If the number of convolutions is too large, the effectiveness decreases due to wall boundary layer effects. The most favorable number of convolutions can be determined empirically and will depend on the application, the size of the apparatus, and other variables.

Second, the divergence angle or slope of the lobes (lobe height h to length x), as shown in FIGS. 1 and 2, is limited in order to avoid three-dimensional boundary layer separation of the flow over the convolutions. The divergence angle may be as low as 5°, but divergence angles as large as 25° have been successfully tested. If the angle is too low, the strength of the vortices may be insufficient. An angle of at least 15° is preferred.

Figure 6:
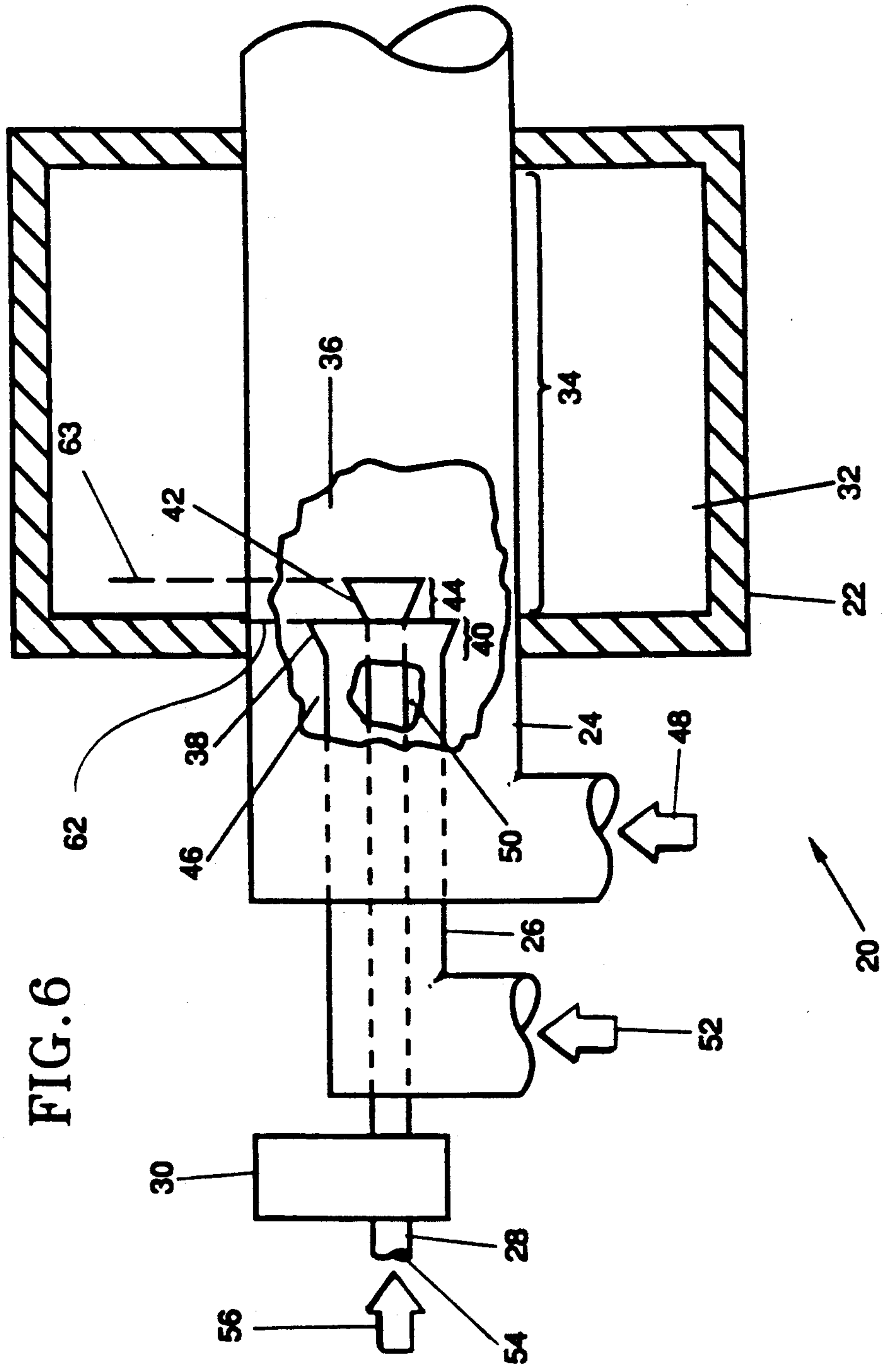
FIG. 6 is an illustrative side view, partially broken away, of a high temperature, indirect gas-fired furnace.

Third, significant penetration of the lobes into the flows should occur. For cylindrical conduits, as shown in FIGS. 3 and 6, penetration is defined as the ratio of the annular area occupied by the convolutions at the outlet edge divided by the total flow area on both sides of the convolutions. It is believed that better results will be achieved when the penetration ratio is within the range of 0.5 to 0.85; however penetration ratios within that range cannot always be attained (and are not required to obtain improved results) due to physical or flow velocity constraints, as was the case with the test configuration hereinafter described in Table 1.

Additionally, based upon empirical results, we believe that as a rule the aspect ratio (i.e. sum of trough depth and lobe height, divided by lobe width) should be between 2.0 and 4.5 in order to create a strong vortex pattern.

Finally, it is believed to be desirable to have as large a portion of the opposed sidewalls of a lobe parallel to each other (or closely parallel to each other) at the lobe outlets in the direction in which the height h of the lobe is measured.

The present invention is shown in an exemplary embodiment in FIG. 6. A high temperature, indirect gas-fired furnace 20 is comprised of a vessel 22, a primary conduit 24, a secondary conduit 26, a fuel conduit 28, and a controller mechanism 30. The vessel 22 defines a heating chamber 32 which is utilized for high temperature heating of articles (not shown) in a controlled atmosphere The primary conduit 24, which is cylindrical, passes through the vessel 22 and has a radiant heating portion 34 which is within the heating chamber 32 and defines a combustion chamber 36. The primary conduit 24 is analogous to the conduit 207 of FIG. 3.

The secondary conduit 26, which is cylindrical, is partially nested within and concentric with the primary conduit 24 and has convolutions 38 on an outlet end 40 which is located at or just upstream of the combustion chamber 36. The convolutions 38 are uniformly spaced about the perimeter of the outlet end 40. The secondary conduit 26 and convolutions 38 are analogous to the conduit 204 and convolutions 206 of FIG. 3.

The fuel conduit 28, which is also cylindrical, is partially nested within, and concentric with, the secondary conduit 26 and has convolutions 42 on its outlet end 44 which is located just upstream of the combustion chamber 36. The convolutions 42 are uniformly spaced about the outlet end 44 and the number of convolutions 42 are the same as on the secondary conduit 26. The fuel conduit 28 and convolutions 42 are analogous to the conduit 202 and convolutions 201 of FIG. 3.

An annular primary passage 46 is formed between the secondary conduit 26 and the primary conduit 24 for a primary oxidant or airflow 48. An annular secondary passage 50 is formed between the fuel conduit 28 and the secondary conduit 26 for a secondary oxidant or airflow 52. A fuel passage 54 for a fuel flow 56 is defined by the fuel conduit 28.

The primary airflow 48 mixes with the secondary airflow 52 immediately downstream of the outlet plane 62 of the secondary conduit 26 and the primary/secondary mixture then mixes with the fuel flow 56 immediately downstream of the outlet plane 63 of the fuel conduit 28. Combustion takes place downstream of the outlet plane 63 and within the combustion chamber 36 where heat from the combustion process radiates or is otherwise transferred to the heating chamber 32.

The controller mechanism 30 is operably connected to the fuel conduit 28. The function of the controller mechanism 30 is to provide a means to manipulate the positions of the convolutions 38,42 on the outlet ends 40,44 of the secondary conduit 26 and fuel conduit 28 relative to each other. Although not shown, the controller mechanism 30 may be a simple handle disposed on the fuel conduit 28 for manual manipulation of the position of the fuel conduit 28 or may be a more complex motorized mechanism automatically controlled by a computer system which monitors the furnace temperature or other parameters and rotates and/or axially moves the conduit 28 to adjust the relative positions of the convolutions 38,42. As mentioned previously, this results in a variation of the rate of mixing between the flows which is directly related to the heat release within the combustion region. This change in position is preferably accomplished by rotation of either the fuel conduit 28 (such as by the controller 30) or the secondary conduit about their longitudinal axis.

The maximum heat release, due to the variation in mixing rates, is achieved with the convolutions 38,42 in-phase (analogous to the position illustrated in FIG. 4, wherein the lobes 218 and troughs 216 of the convolutions 206 are radially aligned with, respectively, the lobes 215 and troughs 217 of the convolutions 201), due to the mutual reinforcement of the flow patterns generated. As the fuel conduit 28 is rotated away from the in-phase condition, the intensity of the vortices generated and the amount of heat released decreases due to the loss of the mutual reinforcement. The minimum heat release is achieved with the convolutions 38,40 out-of-phase (analogous to the position illustrated in FIG. 5, wherein the lobes 218 of the conduit 204 are radially aligned with the troughs 217 of the fuel conduit 202), due to the mutual interference of the flow patterns generated.

The relative axial positioning of the convolutions 38,42 may also affect the rate of mixing. It is relieved that the closer in axial proximity (axial alignment) the planes 62,63 of the outlet ends 40,44 are to each other, the greater the mutual reinforcement (if convolutions 38,42 are in-phase), or interference (if convolutions 38,42 are out-of-phase). As the axial separation between the outlet ends 40,44 increases, the interaction between the flow patterns generated by convolutions 38,42 on the outlet ends 40,44 is reduced. As a result, the alignment, both radial and axial, affects the interaction between the flow patterns and thereby the rate of mixing.

The maximum range of mixing rates should be obtained when the outlet planes (i.e. planes 62 and 63) are in axial proximity, assuming the same amount of relative rotation is available. It should be kept in mind that optimal design of the convolutions 38,42 may require axial displacement in order to permit relative rotation of the conduits 26,28. In some instances, where rotation is mechanically or physically restricted, axial displacement would be used in addition to rotation to modulate the rate of mixing.

The radial proximity of the vortices generated by the convoluted outlet ends 40,44 may also effect the rate of mixing. It is believed that the closer the generated vortices are in radial proximity, the greater the mutual reinforcement (if convolutions 38,42 are in-phase) or interference (if convolutions are out-of-phase). If the radial separation between the vortices generated by the convolutions 38 and the convolutions 42 is too large, no interaction will occur between them.

Tests were performed to determine the effects of relative movement of convolutions on outlet ends of nested conduits on mixing and combustion rates. The lobe and conduit geometric characteristics of the test model are tabulated in Table 1. The test apparatus was similar to the apparatus of FIG. 6, except changes in the relative position of the convolutions were made manually; there was no vessel 22; and the outlet planes 62,63 were axially positioned with plane 63 one-half inch downstream of plane 62.

TABLE 1

| | TEST MODEL CHARACTERISTICS | | |
|---|---|---|---|
| | FUEL | SECONDARY | PRIMARY |
| CONDUIT DIAMETER, D | $D_1 = 0.5$ | $D_2 = 1.0$ | $D_3 = 4.0$ |
| NUMBER OF LOBES | 6 | 6 | 0 |
| LOBE HEIGHT, h | $h_1 = 0.17$ | $h_2 = 0.29$ | — |
| TROUGH DEPTH, d | $d_1 = 0.05$ | $d_2 = 0.18$ | — |
| LOBE LENGTH, x | 0.63 | 1.04 | — |
| DIVERGENCE ANGLE, Θ | 15° | 15° | — |
| LOBE WIDTH, W | $W_1 = 0.08$ | $W_2 = 0.17$ | — |
| PENETRATION RATIO | 0.54 | 0.13 | — |
| LOBE ASPECT RATIO, (h + d)/W | $\frac{h_1 + d_1}{W_1} = 2.75$ | $\frac{h2 + d_2}{W_2} = 2.76$ | — |

The measurement of lobe length x, and lobe divergence angle Θ is as shown in FIG. 1. Other parameters are measured as shown in FIG. 4. Since there were six lobes on each conduit only thirty degrees of rotation was required to go from an in-phase to an out-of-phase condition.

Figure 7:
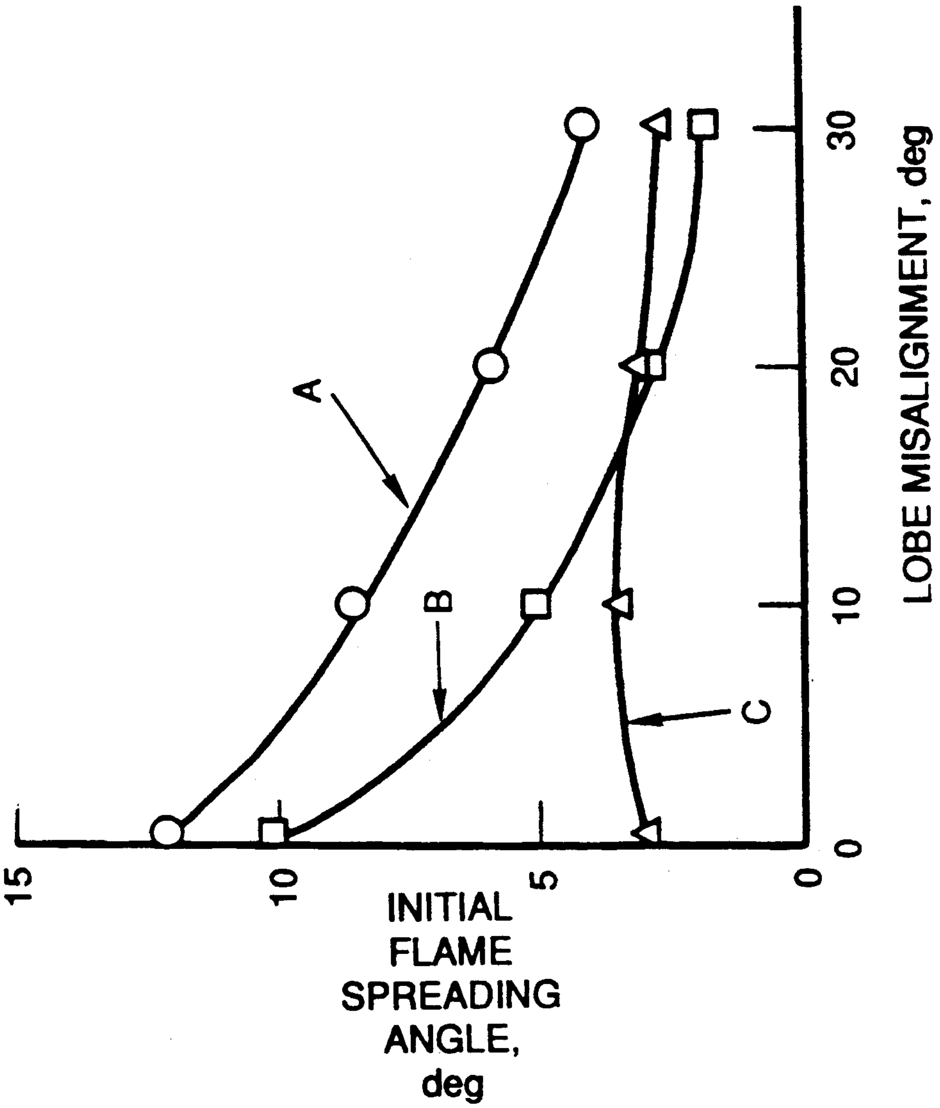
FIG. 7 is a graph of flame spreading angles as a function of angular alignment of the convolutions with a comparison to a trailing edge without convolutions.

FIG. 7 is a graph which presents test results for the test apparatus described above. Three sets of tests (A, B and C) were run with each set run at the flow velocities shown in Table 2. An effort was made to keep the primary and fuel flow velocities constant and to vary the flow velocity of the secondary flow. A set consisted of a run in each of four lobe positions: 1) In-phase (0° misalignment); 2) 10° misalignment; 3) 20° misalignment; and 4) out-of-phase (30° misalignment). FIG. 7 shows the effect of lobe alignment on flame spreading angle, which is directly related to the rate of mixing between the fuel and air flows.

TABLE 2

| | TEST FLOW VELOCITIES (fps) | | |
|---|---|---|---|
| TEST | $V_{primary}$ | $V_{secondary}$ | $V_{fuel}$ |
| A | 33.7 | 31.8 | 94.5 |
| B | 32.2 | 60.4 | 94.5 |
| C | 29.5 | 94.0 | 94.5 |

In test A, the secondary flow velocity was approximately one-third of the fuel flow velocity. The flame spreading angle was 12° for the in-phase position and gradually decreased as the lobes were rotated to the out-of-phase position. In the out-of-phase position the flame spreading angle was less than 5°, which is equivalent to nested conduits without convoluted outlet ends, i.e. a double cylinder configuration. This result confirms the effectiveness of the invention at modulating the mixing rate between multiple flows.

In test B the secondary flow velocity was approximately two-thirds of the fuel flow velocity. The flame spreading angle only attained a value of 10° for the in-phase position and gradually decreased as the lobes were rotated to the out-of-phase position. In test C, in which the secondary flow velocity was equivalent to the fuel flow velocity, the flame spreading angles were less than 5° for all rotational positions, which was no better than nested conduits without convoluted outlet ends. The results of tests A, B and C show the effects of differential flow velocity (between the secondary flow and the fuel flow) on mixing. From these results it appears that, for the configuration tested, differences in the flow velocities for adjacent concentric flows over an outlet end are required to obtain an increase. A significant increase in flame spreading angle beyond the angle produced using non-convoluted outlet ends was achieved when one flow was 50% greater than an adjacent flow. An even greater increase was observed when the velocity difference was 200%. Although the reasons why no increase was observed when there was no velocity differential are not fully understood, it may be that the number of convolutions (six) on each conduit of the test apparatus was too low, resulting in insufficient interaction between adjacent flows. It has been shown by others, such as in AIAA Paper No. 89-0619 *Flame Propagation Enhancement Through Streamwise Vorticity Stirring,* AIAA 27th Aerospace Sciences Meeting (Jan. 9–12, 1989), that vorticity in the flow can be generated with very little flow differential between the adjacent flows. For this reason, we do not believe a velocity differential is required, although it appears to be preferred.

Tests were also conducted on the same test apparatus as described above with the outlet plane of the fuel conduit positioned 0.25, and 0.75 inches downstream of the outlet plane of the secondary conduit. The flame spreading angles for the various rotational positions as a function of axial displacement did not vary significantly. The results of this test indicate that axial displacements of this magnitude (i.e. up to 1.5 times the fuel lobe length) do not significantly reduce the interaction between vortices generated by the two convoluted outlet ends. The importance of such a result is that for lobe geometries which have restricted rotational movement due to physical interference between lobes on the outlet ends, the outlet ends may be axially displaced a distance slightly greater than the lobe length, at which point the physical interference is eliminated, without significantly affecting performance. It is believed, however, that axial displacements of greater than 1.5 times the lobe length will produce significant reductions in the interaction between vortices, and may be used to modulate mixing.

Although, the embodiment of the invention illustrated in FIG. 6 has three concentric, cylindrical conduits 24,26,28 with each of the two inner conduits 26,28 having convolutions on their outlet ends 40,44, it should be obvious to those skilled in the art that the conduits could be of any other shape and need not be concentric. For example, they may have a rectangular cross-section with convolutions along the edge of each side. In such an embodiment rotational movement may be restricted and axial movement may be necessary to modulate the mixing rate.

Figure 8:
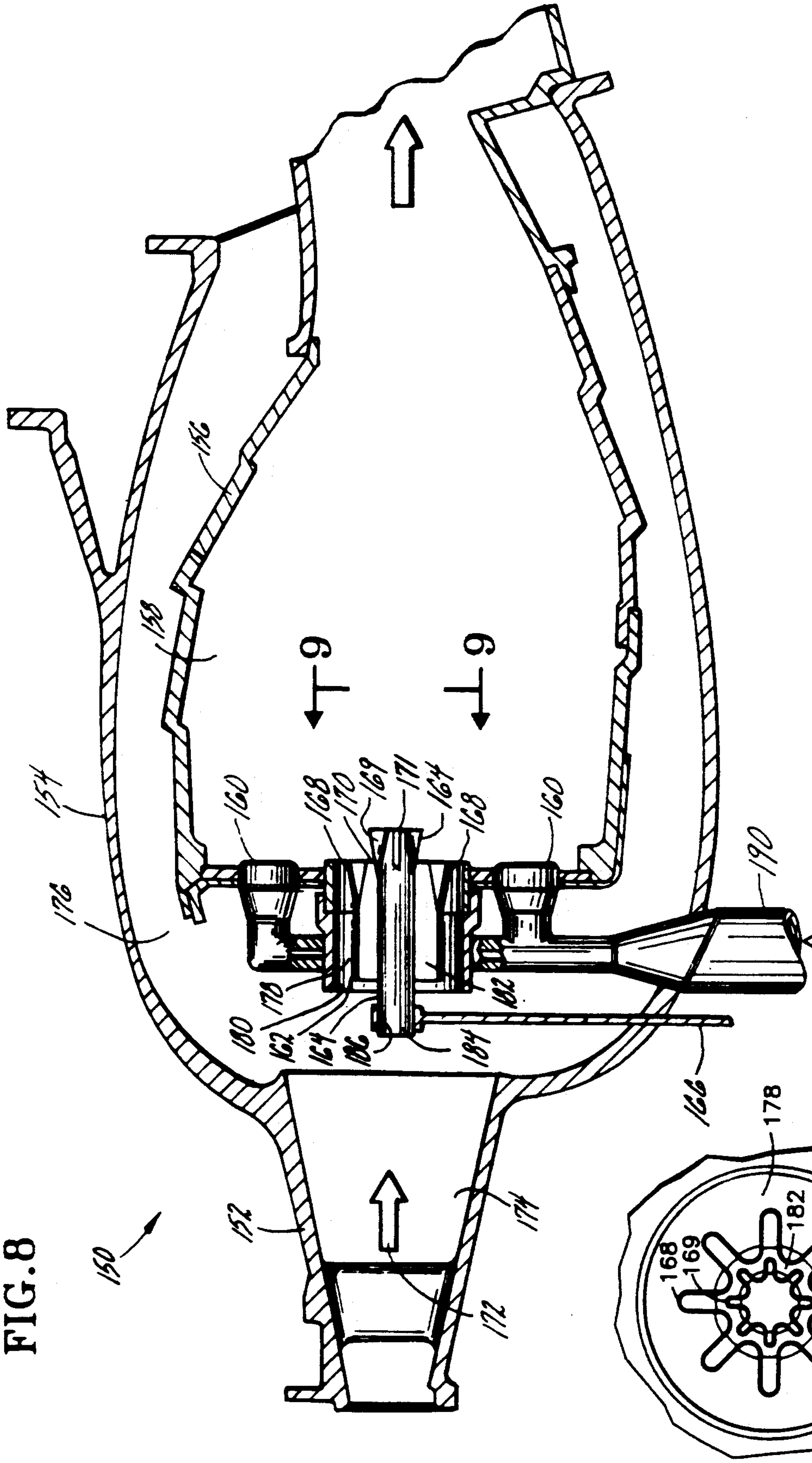
FIG. 8 is an illustrative sectional view of a gas turbine.
Figure 9:
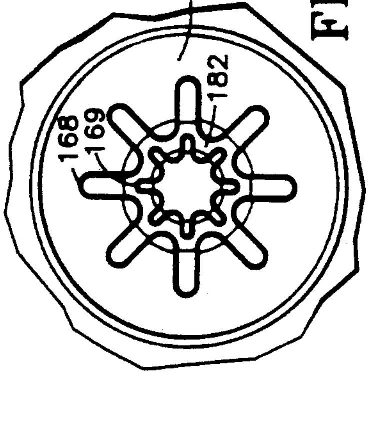
FIG. 9 is an end view of the flow splitters of FIG. 8.

The present invention is shown in another exemplary embodiment in FIG. 8 and its corresponding end view FIG. 9. A gas turbine combustor 150 is comprised of a diffuser 152, a combustor shroud 154, a combustor case 156 defining a combustion region 158, a pair of fuel injectors 160, a primary flow splitter 162, a secondary flow splitter 164 partially nested within the primary flow splitter 162, a cylindrical splitter shroud 180 surrounding the primary splitter 162, and a controller mechanism 166.

The primary flow splitter 162 and secondary flow splitter 164 have convolutions 168,169 on their outlet ends 170,171 which are located at the inlet or upstream end of the combustion region 158. The convolutions 168,169 are uniformly spaced about the perimeter of the outlet ends 170,171. The secondary flow splitter 164 having convolutions 169 is analogous to the conduit 204 with convolutions 206 of FIG. 3. The primary flow splitter 162 with convolutions 168 are analogous to the conduit 202 with convolutions 201 of FIG. 3.

The controller mechanism 166 is operably connected to the primary flow splitter 162. The function of the controller mechanism 166 is to provide a means to manipulate the positions of the convolutions 168,169 on the outlet ends 170,171 of the secondary flow splitter 164 and the primary flow splitter 162 relative to each other. The controller mechanism 166 is analogous to the controller mechanism 30 of FIG. 6.

An airflow 172 passes through a passage 174 defined by the diffuser 152 and upon exiting the diffuser 152, a portion thereof passes through the nested flow splitters 162,164 and into the combustion region 158. A fuel flow 188 enters the combustor shroud 154 through a fuel inlet 190 and passes through the fuel injectors 160 and into the combustion region 158. The airflow passing through the splitters 162, 164 and the shroud 180 mixes with the fuel being sprayed from the injectors 160.

The pair of nested flow splitters 162,164 and the splitter shroud 180 define three airflow passages. A first annular airflow passage 178 is defined between the secondary flow splitter 164 and the shroud 180. A second annular passage 182 is defined by the secondary flow splitter 164 and the primary flow splitter 162. A third flow passage 184 is defined by the cylindrical wall of the primary flow splitter 162.

The convoluted splitters 162, 164 generate large scale counterrotating vortices which breakdown into small scale turbulence downstream of the splitters 162, 164. The vortices generated in the airflow enhance the rate of mixing between the airflow and the fuel being sprayed from the injectors 160 into the region downstream of the splitters 162, 164.

The maximum combustion rate, due to the variation in mixing rates, is achieved with a convolutions 168,169 in-phase due to the mutual reinforcement of the flow patterns generated. As the primary flow splitter 162 is rotated away from the in-phase condition, the intensity of the vortices generated and the rate of combustion decreases due to the loss of the mutual reinforcement. The minimum combustion is achieved with the convolutions 168,169 out-of-phase due to the mutual interference of the flow patterns generated.

As mentioned previously, the relative axially positioning of the splitters 162, 164, may also effect the rate of mixing. As the axial separation between their outlet ends increases, the interaction between the flow patterns generated by the convolutions on the outlet ends is reduced.

Although the invention has been shown and described with respect to exemplary embodiments thereof, it should be understood by those skilled in the art that various changes, omissions and additions may be made therein and thereto, without departing from the spirit and the scope of the invention.

We claim:

1. A device for mixing fluids comprised of:

a pair of nested conduits having a common longitudinal axis and defining at least two flow passages for flowing fluids in a common downstream flow direction, each of said conduits having an outlet end, said outlet ends being in proximity to each other and relatively moveable with respect to each other, each of said outlet ends having a plurality of convolutions thereon, said convolutions disposed about the longitudinal axis of said conduits, said convolutions engaging the fluids to generate flow components in the fluid which are perpendicular to the downstream flow direction, the convolutions on one outlet end having an aligned position with the convolutions on the other outlet end whereby flow components of a similar orientation are aligned and thereby reinforce each other and a non-aligned position whereby flow components of a similar orientation are not aligned, and wherein in the aligned position interaction between the aligned flow components generates adjacent pairs of counter-rotating large scale vortices; and controller means operably connected to at least one of said outlet ends to cause relative movement between one of said outlet ends and the other of said outlet ends the relative movement shifting said convolutions between the aligned position and the non-aligned position to thereby vary the rate of mixing between the fluids.

2. The mixing device according to claim 1, wherein said outlet ends are rotatably relative to each other about said axis, and said controller means is adapted to rotate said outlet ends relative to each other about said axis.

3. The mixing device according to claim 1, wherein said outlet ends are axially displaceable relative to each other and said controller means is adapted to axially displace one of said outlet ends relative to the other of said outlet ends.

4. The mixing device according to claim 2, wherein said convolutions comprise a plurality of adjacent lobes and troughs, said lobes and troughs are axisymmetrically disposed about said axis, and the number of lobes and troughs on each of said outlet ends is the same.

5. The mixing device according to claim 4, wherein the divergence angle for each of said lobes and troughs is between 5° and 25°, and the penetration ratio for said convolutions is between 0.5 and 0.85.

6. The mixing device according to claim 4, including a third conduit surrounding said pair of conduits defining a third flow passage between said third conduit and the radially outermost of said pair of conduits, and wherein each of said pair of nested conduits is cylindrical.

7. The mixing device according to claim 6, wherein said third conduit defines a combustion chamber immediately downstream of said outlet ends, wherein one of said conduits defines a passage for carrying a fuel, another of said conduits defines a passage for carrying an oxidant, wherein the fuel and oxidant are mixed and combusted in the combustion chamber, and wherein the relative movement varies the rate of combustion of the fuel and oxidant mixture.

8. A mixing device according to claim 1, further comprising a burner having a combustion region downstream of said outlet ends, wherein one of the fluids flowing through one of the flow passages is a fuel, wherein another of the fluids flowing through another of the flow passages is an oxidant, wherein the fuel and oxidant are mixed in the combustion region, wherein the fuel and oxidant mixture is combusted in the combustion region, and wherein the relative movement varies the rate of combustion of the fuel and oxidant mixture.

9. The burner according to claim 8, wherein said conduit means is comprised of a pair of nested conduits having a common longitudinal axis and defining at least two flow passages, each of said conduits having an outlet end, wherein said convolution means is comprised of a plurality of convolutions disposed about the longitudinal axis of said conduits, wherein said controller means is operably connected to at least one of said outlet ends to cause relative movement between said convolutions on one of said outlet ends and said convolutions on said other outlet end.

10. The burner according to claim 9, further comprising a furnace having a heating chamber and a primary conduit, wherein one of said nested conduits is a secondary conduit disposed within and spaced radially from said primary conduit defining a primary flow passage therebetween for carrying an oxidant, wherein the other of said nested conduits is a fuel conduit disposed within and spaced radially from said secondary conduit defining a secondary flow passage therebetween for carrying an oxidant, said fuel conduit adapted to carry fuel and defining a fuel passage, and wherein said combustion region is in heat exchange relation to said heating chamber.

11. The improved furnace according to claim 10, wherein said secondary and fuel outlet ends are rotatable relative to each other about said axis, and said control means is adapted to rotate said secondary and fuel outlet ends relative to each other about said axis.

12. The improved furnace according to claim 10, wherein said secondary and fuel outlet ends are axially displaceable relative to each other about said axis, and said control means is adapted to axially displace said fuel outlet end relative to said secondary outlet end.

13. The improved furnace according to claim 10, wherein said convolutions on said secondary and fuel outlet ends comprise a plurality of adjacent lobes and troughs, said lobes and troughs are axisymmetrically disposed about said axis, and the number of lobes and troughs on each of said outlet ends is the same.

14. The burner according to claim 9, further comprising a gas turbine combustor having a diffuser, a combustor shroud, a combustor case defining the combustion region, and a plurality of fuel injectors, wherein one of said nested conduits is a primary flow splitter disposed downstream of said diffuser, wherein the other of said nested conduits is a secondary flow splitter disposed within and spaced radially from said primary flow splitter, and wherein said plurality of fuel injectors are disposed adjacent to said flow splitters and adapted to carry fuel.

15. The improved gas turbine according to claim 14, wherein said secondary and primary outlet ends are rotatable relative to each other about said axis, and said control means is adapted to rotate said secondary and primary outlet ends relative to each other about said axis.

16. The improved gas turbine combustor according to claim 14, wherein said secondary and primary outlet ends are axially displaceable relative to each other about said axis, and said control means is adapted to axially displace said primary outlet end relative to said secondary outlet end.

17. The improved gas turbine combustor according to claim 14, wherein said convolutions on said secondary and primary outlet ends comprise a plurality of adjacent lobes and troughs, said lobes and troughs are axisymmetrically disposed about said axis, and the number of lobes and troughs on each of said outlet ends is the same.

* * * * *